Patented Apr. 29, 1952

2,595,173

UNITED STATES PATENT OFFICE 2,595,173

TRITHIALS OF SALICALDEHYDE AND THEIR CHLORINATED DERIVATIVES AS INSECTICIDAL AND FUNGICIDAL COMPOSITIONS

Albert J. Shmidl, Houston, Tex., assignor, by mesne assignments, to Standard Oil Development Company, Elizabeth, N. J., a corporation of Delaware No Drawing. Application May 31, 1950, Serial No. 165,376

8 Claims. (Cl. 167—33)

1

The present invention is directed to an insecticidal and fungicidal composition which contains a compound selected from the group consisting of the trithials of the hydroxy benzaldehydes and their halogenated derivatives.

The present invention specifically is directed to a composition adapted for use in an insecticide and fungicide which comprises a major amount of a carrier vehicle and a minor amount of a compound selected from the group consisting of the trithials of hydroxy benzaldehydes and their halogenated derivatives.

The carrier vehicle employed in the practice of the present invention may be a finely divided solid particulate material, such as diatomaceous earth, clay, talc, chalk and the like, or it may be an organic solvent such as an aliphatic alcohol. Illustrative of the aliphatic alcohols finding usage in the present invention may be mentioned methyl, ethyl, isopropyl, normal propyl, the butyl and amyl alcohols. The higher members of the same homologous series may also be employed as the solvent.

An aqueous medium may also be employed in the composition of the present invention as the carrier vehicle. For example, the compounds selected from the group consisting of the trithials of the hydroxy benzaldehydes and their halogenated derivatives may be suspended or dissolved in an aqueous medium, such as aqueous alcohol or water to which may be added an emulsifying agent. To this suspension or solution may be added other materials, such as binding agents, or stickers such as high molecular weight, high boiling oils to cause adherence of the insecticidal and fungicidal composition to surfaces to which it is applied.

It is also contemplated that when the carrier vehicle is a finely divided solid particulate material, such as clay, talc, chalk, diatomaceous earth, and the like, that a wetting agent may be added thereto as part of the composition to allow adherence of the powdery material containing the insecticide and fungicide to surfaces to be treated thereby.

When the carrier material is a finely divided solid particulate material, as described above, it will comprise at least 50% by weight of the composition and included therein will ordinarily be a wetting agent in an amount in the range of 0.1% to 1% by weight with the remainder of the composition being a compound selected from the group consisting of the trithials of hydroxy benzaldehydes and their halogenated derivatives. On the other hand, when the compound includes an alcohol or similar solvent as the carrier vehicle, the compounds selected from the group consisting of the trithials of hydroxy benzaldehyde and their halogenated derivatives will be used in an amount ordinarily no greater than 10% by weight of the solution.

In compositions wherein an aqueous medium, such as water, is employed as the carrier agent, the compounds selected from the group consisting of the trithials of hydroxy benzaldehydes and their halogenated derivatives may be used in an amount in the range of 0.001% and 1% by weight and an emulsifying agent may also be employed in an amount in the range of between 0.1% and 1% by weight with the remainder of the composition being the aqueous medium, such as water.

The trithials employed in the practice of the present invention are the reaction product of a hydroxy benzaldehyde and hydrogen sulfide. The trithials may be formed by the acid catalyzed reaction of H₂S with a hydroxy benzaldehyde as illustrated by the following equation:

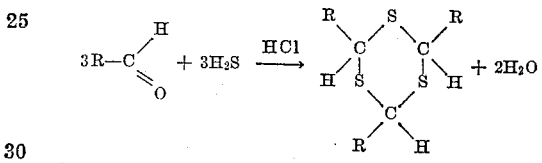

where R is a phenyl grouping. The trithials of hydroxy benzaldehyde may be formed by reacting hydrogen sulfide with ortho, meta, or para-hydroxy benzaldehyde. Ordinarily it would be desirable to use the ortho form which is commonly called salicylaldehyde. The following structural formula represents the trithials formed by reacting salicylaldehyde and hydrogen sulfide.

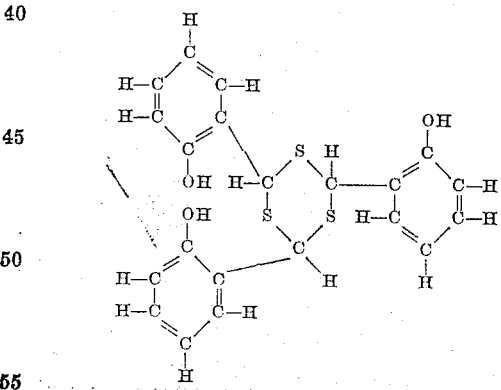

The trithials of hydroxy benzaldehyde employed in the composition of the present invention may be produced by dissolving the hydroxy benzaldehyde in an organic solvent, such as an alcohol or paraffinic hydrocarbon, and the like. Hydrogen sulfide may be caused to react with the hydroxy benzaldehyde in the organic solvent by bubbling hydrogen sulfide through the solution. Usually a temperature in the range from about 60° to about 100° F. will give a satisfactory reaction. Good results may be obtained at about 85° F. Hydrogen chloride or other similar activating catalyst may be employed to initiate the reaction. It is desirable, when using hydrogen chloride to initiate the reaction, to employ it in the anhydrous form since, if water is present, there is the danger that a sludgy, viscous polymer may be produced. In reacting hydroxy benzaldehyde under the foregoing conditions the trithial separates as crystals which are easily separated from the solution. When the halogenated derivatives of the trithials are produced, it will be desirable to use substantially dry chlorine gas in reaction with the trithial in the solution in which it is formed. The amount of anhydrous chlorine which will be sufficient to cause chlorination is an amount a little less than saturation of the solvent employed initially to dissolve the hydroxy benzaldehyde. A trithial of salicylaldehyde was prepared by allowing hydrogen sulfide to pass continuously for several hours into a solution of salicylaldehyde in normal heptane at a temperature of 85° F. A trace of anhydrous hydrogen chloride was added to the hydrogen sulfide to initiate the reaction. The trithials appeared in excellent yield as crystalline precipitates which were separated from the solutions.

In another run, the trithial of salicylaldehyde was formed in the solution as a halogenated derivative by adding, besides the hydrogen sulfide, a sufficient amount of chlorine to cause formation of the chlorinated derivatives.

In producing the trithials from salicylaldehyde by reaction of salicylaldehyde and $H_2S$ in an alcoholic solution, the trithial separates as pale pink and nearly white crystals which are obtained in 98% of the theoretical yield. The trithial is high in sulfur content and contains 17.8% by weight of sulfur in one example. The chlorinated trithial formed by reacting salicylaldehyde in hydrogen sulfide with chlorine contained 22.5% by weight of chlorine.

In order to illustrate the invention further, the trithial formed by reacting salicylaldehyde and $H_2S$ was tested for insecticidal and fungicidal properties. The fungicidal properties were tested on the fungi, *Alternaria solani* and *Sclerotinia fructiola*. These fungi are the cause of early blight on potatoes and tomatoes and the appearance of brown rot on peaches, respectively. The test method employed, in which the amount of fungicides necessary to obtain 50% mortality is determined, has been described by Horsfall, "Fungicides and Their Action," The Chronica Botannica Co., Waltham, Massachusetts, 1945.

In the particular technique employed, a culture of the common test organisms was maintained in the laboratory under sterile conditions. The slide germination method, which is widely used in botanical investigations, was employed as the test method. In this technique fungus spores obtained under controlled conditions as regards species, strains, medium, age, temperature and concentration and stimulant, if desired, are suspended in distilled water. Aliquots of this suspension are pipetted into dilutions or suspensions of the chemical to be tested. Droplets of the resulting mixture are pipetted onto 1 by 3 inch glass slides. These are placed in moist chambers which are sealed with water and held at a temperature suitable for germination. After 20 hours the slides are removed from the moist chambers and the droplets examined under a low power microscope. The percentage spores inhibited from germinating, based on one hundred spores counted from each drop, are recorded. Ordinarily, in testing a single compound, it is usually desirable to make several thousand spore counts.

On testing the fungicidal properties of a composition in accordance with the present invention, it was found that an aqueous suspension or solution of the trithial of salicylaldehyde containing an amount in the range between 0.001 and 0.0001% allowing only 50% germination of *Alternaria solani* and *Sclerotinia fructiola*. These results show that the composition is exceedingly effective in inhibiting germination of these two fungi and is as effective as Bordeaux mixture which is usually employed as a standard.

The toxity of the composition of the present invention was tested against coleus in an aqueous suspension or solution containing 0.5% by weight of the trithial of salicylaldehyde. Immersing coleus in this composition for 24 hours gave no indications of injury. The standard test for injury to plants is immersion of the plants in 0.2% by weight of dinitro-o-cresol which gives complete death of the plant in 24 hours.

To test further the effect of the trithial of salicylaldehyde on the toxity to plant life in an active state of growth, seven applications of the composition of the present invention containing 50% by weight of diatomaceous earth and a small amount of a wetting agent and the remainder of the trithial were dusted on 50 rows of growing potato plants. These seven applications were made at approximately one week intervals without showing any deleterious effect on the potato plants. The trithial of salicylaldehyde was also tested as an insecticide against the German roach, the milkweed bug and the male and female American roach. The composition of the present invention was employed as an aqueous solution or suspension containing 0.25% by weight of the trithial of salicylaldehyde and was effective as a contact insecticide.

The blood stream insecticidal activity was tested by injecting the male and female American roach with a solution of 5 milligrams of the test solution per gram of body weight of the insect. Again the trithial of salicylaldehyde showed insecticidal activity.

The chlorinated derivative of the trithial of salicylaldehyde was also tested on the two fungi mentioned above and when employed in concentration between 0.01 and 0.001% was effective in allowing only 50% germination of these two fungi. On testing the chlorinated trithials against the German roach and milkweed bug in compositions containing 0.25% by weight of solutions or suspensions resulted in 75% and 100% kill of the German roach and milkweed bug respectively. On employing the chlorinated trithials in blood stream injections of the male and female roach insecticidal activity was also indicated, a value of 80% mortality for the male roach and 75% for the female roach being obtained. The chlorinated trithial of salicylaldehyde is also effective against houseflies showing 100% kill in the Nelson drop test which when the solution was diluted 1 to 5 concentration showed a 60% kill indicating that the chlorinated trithial is effective against the housefly as an insecticide.

In employing the composition of the present invention as a powder, it will be desirable to add to the composition a wetting agent in an amount in the range of 0.1 and 1% by weight of the composition. Suitable wetting agent may include the complex phosphates, the water soluble sodium sulfonates, the alkyl esters of sodium sulpho succinate, esters of sulfonated carboxylic acids, alkali metal sulfonated fatty acids, such as those obtained from coconut and palm oil, alkali metal alkyl naphthalene sulfonates, alkali metal aryl sulfonates, and many other too numerous to mention here.

In the composition where the carrier vehicle is an aqueous medium, it will be desirable to employ an emulsifying agent. Suitable emulsifying agents are included among the wetting agents mentioned above. Other suitable emulsifying agents include higher alcohol derivatives (Dupanol OS of the Du Pont Co.), oleic acid derivative of polyethylene sorbitol (G-1096 of the Atlas Powder Co.), and alkylated aryl polyether alcohol (Triton X-100 of the Rohm and Haas Co.).

It is within the purview of my improved invention to employ sticking agents when the carried vehicle is an aqueous medium. For example, it may be desirable to employ a small amount of a high molecular weight and high boiling hydrocarbon oil in admixture with the compounds selected from the group consisting of the trithials of hydroxy benzaldehyde and their halogenated derivatives, a wetting agent, as well as the carrier vehicle which is an aqueous medium.

While the present invention has been described and illustrated by reference to the chlorinated derivatives of the trithials of hydroxy benzaldehyde, it is to be understood that other halogens may be used in lieu of chlorine, for example, bromine and iodine may be employed as the halogenating agent, although chlorine will be preferred.

The nature and objects of the present invention having been completely described and illustrated, what I wish to claim as new and useful and to secure by Letters Patent is:

1. A method for treating living plants which comprises forming a mixture of a minor amount of a compound selected from the group consisting of a trithial of salicylaldehyde and a reaction product thereof containing 22.5% by weight of chlorine and obtained by adding hydrogen sulfide and chlorine to a solution of salicylaldehyde in normal heptane at a temperature of about 85° F. to which a trace of anhydrous hydrogen chloride is added to initiate the reaction, at least 50% by weight of a diluent carrier vehicle, and a minor amount of a wetting agent, and applying said mixture to plants in an active state of growth to destroy insects and fungi on said plants.

2. The method of claim 1 in which the carrier vehicle is diatomaceous earth.

3. A method for treating living plants which comprises forming a mixture of a minor amount of a compound selected from the group consisting of a trithial of salicylaldehyde and a reaction product thereof containing 22.5% by weight of chlorine and obtained by adding hydrogen sulfide and chlorine to a solution of salicylaldehyde in normal heptane at a temperature of about 85° F. to which a trace of anhydrous hydrogen chloride is added to initiate the reaction, at least 50% by weight of finely divided diatomaceous earth and a minor amount of a wetting agent, and applying said mixture to plants in an active state of growth to destroy insects and fungi on said plants.

4. The method of claim 1 in which the carrier vehicle is an aliphatic alcohol.

5. The method of claim 1 in which the carrier vehicle is water containing an emulsifying agent.

6. A composition adapted for use as an insecticide and fungicide which comprises at least 50% by weight of diatomaceous earth, a wetting agent in an amount in the range between 0.1% and 1% by weight and the remainder a compound selected from the group consisting of a trithial of salicylaldehyde and a reaction product thereof containing 22.5% by weight of chlorine and obtained by adding hydrogen sulfide and chlorine to a solution of salicylaldehyde in normal heptane at a temperature of about 85° F. to which a trace of anhydrous hydrogen chloride is added to initiate the reaction.

7. A composition adapted for use as an insecticide and fungicide which comprises a solution in an aliphatic alcohol of a compound, in an amount no greater than 10% by weight, selected from the group consisting of a trithial of salicylaldehyde and a reaction product thereof containing 22.5% by weight of chlorine and obtained by adding hydrogen sulfide and chlorine to a solution of salicylaldehyde in normal heptane at a temperature of about 85° F. to which a trace of anhydrous hydrogen chloride is added to initiate the reaction.

8. A composition adapted for use as an insecticide and fungicide which comprises an admixture of a compound, in an amount in the range between 0.0001% and 1.0% by weight selected from the group consisting of a trithial of salicylaldehyde and a reaction product thereof containing 22.5% by weight of chlorine and obtained by adding hydrogen sulfide and chlorine to a solution of salicylaldehyde in normal heptane at a temperature of about 85° F. to which a trace of anhydrous hydrogen chloride is added to initiate the reaction in an amount in the range between 0.0001% and 1.0% by weight, an emulsifying agent in an amount in the range between 0.1% and 1.0% by weight and the remainder water.

ALBERT J. SHMIDL.

REFERENCES CITED

The following references are of record in the file of this patent:

McGovran et al., U. S. Bur. of Ent. and Plant Quar. Bulletin E-768, 16 pages (1949).

Frear, A Catalogue of Insecticides and Fungicides, vol. I, 1947, page 160.

Beilstein, vol. 19, page 403 (1934 edition).